(12) United States Patent
Crosman, III et al.

(10) Patent No.: US 11,981,230 B2
(45) Date of Patent: May 14, 2024

(54) METHOD TO CONTROL MULTIPLE PARALLEL BATTERY PACKS

(71) Applicant: Caterpillar Inc., Peoria, IL (US)

(72) Inventors: Alexander C. Crosman, III, Dunlap, IL (US); Joseph Oluwagbeminiyi Oyekan, Peterborough (GB)

(73) Assignee: Caterpillar Inc., Peoria, IL (US)

( * ) Notice: Subject to any disclaimer, the term of this patent is extended or adjusted under 35 U.S.C. 154(b) by 115 days.

(21) Appl. No.: 17/551,043

(22) Filed: Dec. 14, 2021

(65) Prior Publication Data

US 2023/0182620 A1  Jun. 15, 2023

(51) Int. Cl.
*B60L 58/21* (2019.01)
*B60L 58/12* (2019.01)
*H01M 10/44* (2006.01)

(52) U.S. Cl.
CPC ............. *B60L 58/21* (2019.02); *B60L 58/12* (2019.02); *H01M 10/441* (2013.01);
(Continued)

(58) Field of Classification Search
CPC ...... B60L 58/21; B60L 58/12; B60L 2200/40; H01M 10/441; H01M 2220/20; B60Y 2200/415; H02J 7/0014; H02J 7/0025
(Continued)

(56) References Cited

U.S. PATENT DOCUMENTS 6,380,719 B2 * 4/2002 Underwood ............ H02J 3/38
307/85

8,874,298 B2 * 10/2014 Houchin-Miller ...... B60L 58/21
903/903
(Continued)

FOREIGN PATENT DOCUMENTS

CN  104953198  9/2015
CN  103050987  1/2016
(Continued)

OTHER PUBLICATIONS

Chung-Ti Hsu, Su Sheng, Qian Sun, Peng Li and B. Lehman, "Increased energy delivery for parallel battery packs with no regulated bus," Intelec 2012, Scottsdale, AZ, USA, 2012, pp. 1-8, doi: 10.1109/INTLEC.2012.6374507. (Year: 2012).*
(Continued)

*Primary Examiner* — M Baye Diao
(74) *Attorney, Agent, or Firm* — Schwegman, Lundberg & Woessner (57) ABSTRACT

A method of operating a machine battery system having multiple battery packs connectable in parallel includes bringing a first battery pack with the highest offline pack voltage online for discharging, including a pack controller circuit of the first battery pack bringing one or more individual battery strings of the first battery pack online; bringing a next battery pack with a next highest offline pack voltage online when the next highest offline pack voltage is within a predetermined discharge threshold voltage of a load voltage, including the pack controller circuit bringing one or more individual battery strings of the next battery pack online; and waiting to bring the next battery pack online, when the next highest offline pack voltage is less than a predetermined discharge threshold voltage of the load voltage, until the next highest offline pack voltage is within the predetermined discharge threshold voltage.

13 Claims, 5 Drawing Sheets

(52) U.S. Cl.
CPC ..... *B60L 2200/40* (2013.01); *B60Y 2200/415* (2013.01); *H01M 2220/20* (2013.01)

(58) Field of Classification Search
USPC .......................................................... 320/135
See application file for complete search history.

(56) References Cited

U.S. PATENT DOCUMENTS

| | | | |
|---|---|---|---|
| 9,350,187 B2 | 5/2016 | Shreevani et al. | |
| 10,353,007 B2* | 7/2019 | Wada | G01R 31/367 |
| 10,449,867 B2* | 10/2019 | Hong | B60L 50/66 |
| 10,811,869 B2* | 10/2020 | Pevear | H02H 7/18 |
| 10,843,578 B2* | 11/2020 | Baumann | E02F 9/207 |
| 11,557,796 B2* | 1/2023 | Hilligoss | H02J 7/0019 |
| 2010/0268407 A1* | 10/2010 | Yanagisawa | B60K 6/46 |
| | | | 180/65.265 |
| 2013/0175857 A1 | 7/2013 | Shreevani et al. | |
| 2017/0166075 A1 | 6/2017 | Hong et al. | |
| 2018/0191038 A1* | 7/2018 | Li | H01M 10/0525 |
| 2020/0231064 A1* | 7/2020 | Zhao | B60L 50/64 |
| 2020/0274368 A1 | 8/2020 | Crouse, Jr. | |
| 2021/0083505 A1 | 3/2021 | Beaston | |

FOREIGN PATENT DOCUMENTS

| | | | | |
|---|---|---|---|---|
| CN | 106816652 | | 8/2019 | |
| CN | 115967157 A | * | 4/2023 | ................ H02J 7/02 |
| WO | WO-2007092955 A2 | * | 8/2007 | .............. B60L 15/20 |
| WO | WO-2013186209 A2 | * | 12/2013 | .............. B60L 1/003 |
| WO | WO-2021109080 A1 | * | 6/2021 | ........ H01M 10/0525 |

OTHER PUBLICATIONS

A. M. A. Oteafy and H. Farooq, "An Active Current-Controlled Battery Pack Balancing Technique for Online Operation," 2020 IEEE Transportation Electrification Conference & Expo (ITEC), Chicago, IL, USA, 2020, pp. 478-483, doi: 10.1109/ITEC48692.2020.9161505. (Year: 2020).*

Written Opinion and International Search Report for Int'l. Patent Appln. No. PCT/US2022/051895, dated Mar. 21, 2023 (9 pgs).

* cited by examiner

METHOD TO CONTROL MULTIPLE PARALLEL BATTERY PACKS

TECHNICAL FIELD

This document relates to rechargeable battery technology and in particular to techniques of activating multiple battery packs in parallel to power large moving work machines.

BACKGROUND

Powering a large moving work machine (e.g., a wheel loader) with an electric motor requires a large mobile electric energy source that can provide current of tens to hundreds of Amperes (Amps). Multiple large capacity battery cells connected in parallel as battery strings can provide the sustained energy power needed by a large electric-powered moving work machine. However, when multiple battery strings are connected in parallel, it is necessary to avoid connecting battery cells that differ too much in their state of charge. Failure to avoid this would result in high currents and cause potential damage to the batteries when the battery charge of the multiple battery cells tries to equalize between the battery strings.

SUMMARY OF THE INVENTION

Electric powered large moving work machines use large capacity battery systems. A large capacity battery system should be brought online safely.

An example battery system includes a system controller circuit; a load bus; and multiple battery packs connectable to the load bus. A battery pack includes a pack controller circuit and multiple battery strings that each include one or more battery cells. The pack controller circuit is configured to determine an offline voltage of the battery pack and communicate the offline voltage to the system controller circuit; receive a command from the system controller circuit to bring the battery pack online in a discharge state; bring individual battery strings of the battery pack online and connect the battery pack to the load bus when the battery pack has a highest offline voltage and other battery packs are unconnected to the load bus; bring individual battery strings of the battery pack online and connect the battery pack to the load bus when the battery pack has the highest offline voltage of battery packs unconnected to the load bus and the offline voltage is within a predetermined threshold of a load voltage; and wait to connect the battery pack to the load bus when the battery pack has the highest offline voltage of battery packs unconnected to the load bus and the offline voltage is less than the predetermined threshold of the load voltage.

An example method of operating a machine battery system having multiple battery packs connectable in parallel includes bringing a first battery pack with the highest offline pack voltage online for discharging, including a pack controller circuit of the first battery pack bringing one or more individual battery strings of the first battery pack online; bringing a next battery pack with a next highest offline pack voltage online when the next highest offline pack voltage is within a predetermined discharge threshold voltage of a load voltage, including the pack controller circuit bringing one or more individual battery strings of the next battery pack online; and waiting to bring the next battery pack online, when the next highest offline pack voltage is less than a predetermined discharge threshold voltage of the load voltage, until the next highest offline pack voltage is within the predetermined discharge threshold voltage.

DETAILED DESCRIPTION

Examples according to this disclosure are directed to methods and systems for automatically bringing a large capacity battery system online safely. As explained previously herein, a battery system with multiple battery strings of large capacity battery cells connected in parallel should be brought online in a manner that avoids high inrush currents if batteries with uneven charge are connected in parallel. The high inrush currents could damage the battery cells, the interconnecting electric cables of the battery system, and the load.

Figure 1:
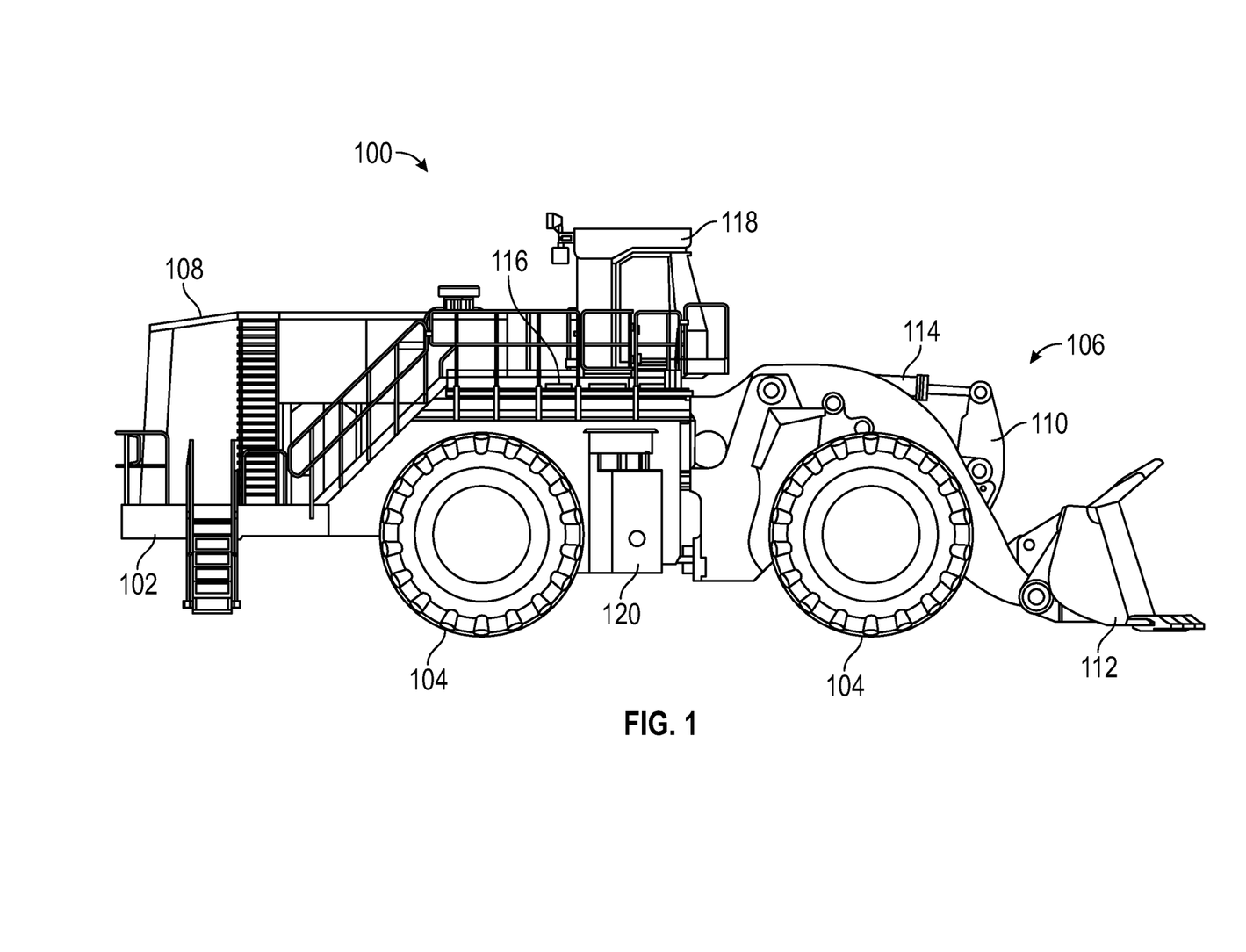
FIG. 1 is an elevation view depicting an example work machine in accordance with this disclosure.

FIG. 1 depicts an example machine 100 in accordance with this disclosure. In FIG. 1, machine 100 includes frame 102, wheels 104, implement 106, and a speed control system implemented in one or more on-board electronic devices like, for example, an electronic control unit or ECU. Example machine 100 is a wheel loader. In other examples, however, the machine may be other types of machines related to various industries, including, as examples, construction, agriculture, forestry, transportation, material handling, waste management, and so on. Accordingly, although a number of examples are described with reference to a wheel loader machine, examples according to this disclosure are also applicable to other types of machines including graders, scrapers, dozers, excavators, compactors, material haulers like dump trucks, along with other example machine types.

Machine 100 includes frame 102 mounted on four wheels 104, although, in other examples, the machine could have more than four wheels. Frame 102 is configured to support and/or mount one or more components of machine 100. For example, machine 100 includes enclosure 108 coupled to frame 102. Enclosure 108 can house, among other components, an electric motor to propel the machine over various terrain via wheels 104. In some examples, multiple electric motors are included in multiple enclosures at multiple locations of the machine 100.

Machine 100 includes implement 106 coupled to the frame 102 through linkage assembly 110, which is configured to be actuated to articulate bucket 112 of implement 106. Bucket 112 of implement 106 may be configured to transfer material such as, soil or debris, from one location to another. Linkage assembly 110 can include one or more cylinders 114 configured to be actuated hydraulically or pneumatically, for example, to articulate bucket 112. For example, linkage assembly 110 can be actuated by cylinders 114 to raise and lower and/or rotate bucket 112 relative to frame 102 of machine 100.

Platform 116 is coupled to frame 102 and provides access to various locations on machine 100 for operational and/or maintenance purposes. Machine 100 also includes an operator cabin 118, which can be open or enclosed and may be accessed via platform 114. Operator cabin 118 may include one or more control devices (not shown) such as, a joystick, a steering wheel, pedals, levers, buttons, switches, among other examples. The control devices are configured to enable the operator to control machine 100 and/or the implement 106. Operator cabin 118 may also include an operator interface such as, a display device, a sound source, a light source, or a combination thereof.

Machine 100 can be used in a variety of industrial, construction, commercial or other applications. Machine 100 can be operated by an operator in operator cabin 118. The operator can, for example, drive machine 100 to and from various locations on a work site and can also pick up and deposit loads of material using bucket 112 of implement 106. As an example, machine 100 can be used to excavate a portion of a work site by actuating cylinders 114 to articulate bucket 112 via linkage 110 to dig into and remove dirt, rock, sand, etc. from a portion of the work site and deposit this load in another location.

Machine 100 can include a battery compartment connected to frame 102 and including a battery system 120. Battery system 120 is electrically coupled to the one or more electric motors of the machine 100.

Figure 2:
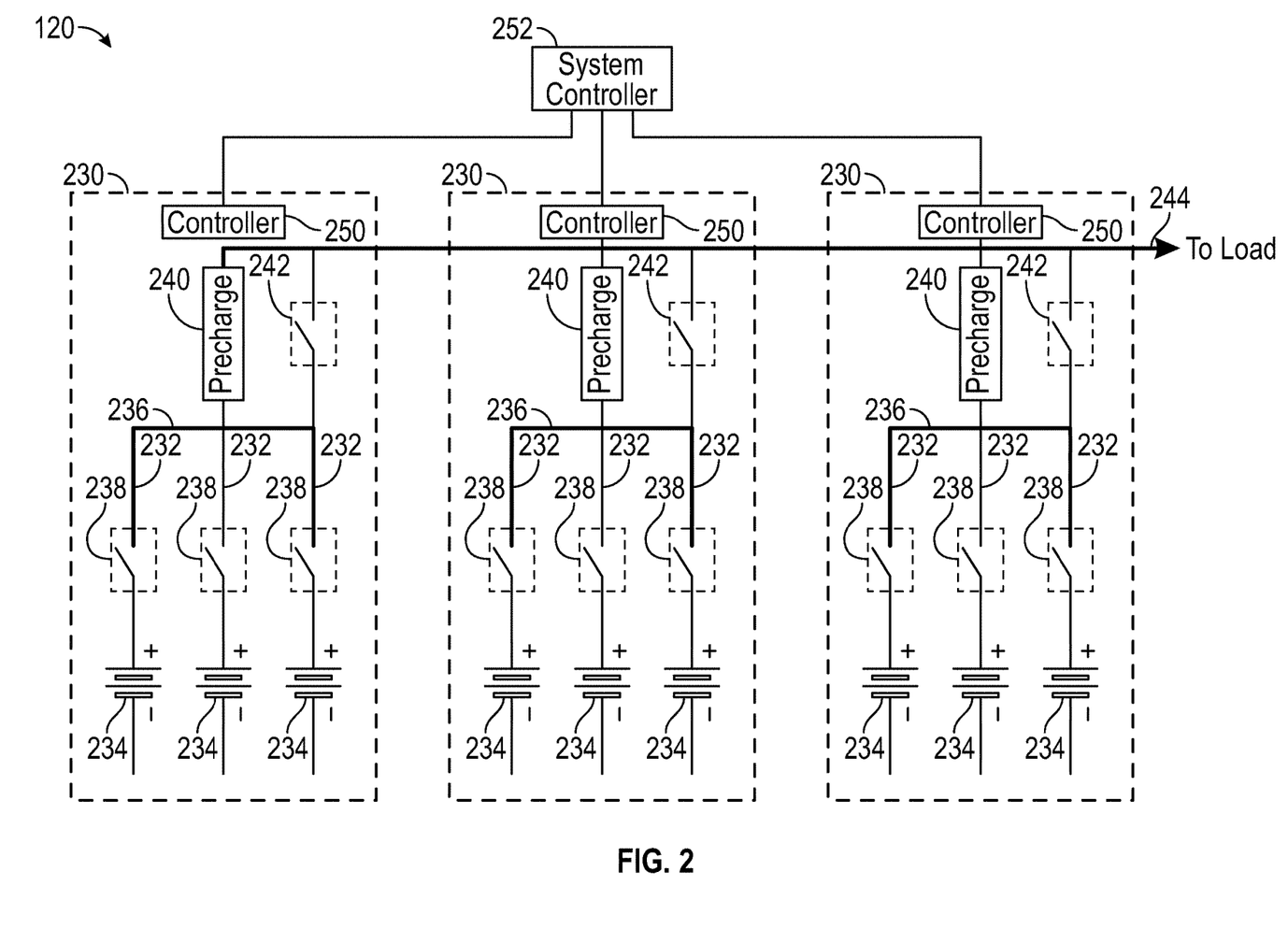
FIG. 2 is a block diagram of a modular battery system for a work machine.

FIG. 2 is a block diagram of a modular battery system 120. The battery system can be used to provide power to a machine, such as the example machine 100 of FIG. 1. The battery system 120 includes multiple battery packs 230 (e.g., two to eight battery packs). Each battery pack 230 includes multiple battery strings 232 (e.g., two to five battery strings). Each battery string 232 includes a large capacity battery 234 (e.g., a 750 Volt, 80 Amp-hour battery, or 60 kilowatt-hours). Each battery string 232 includes a battery contactor switch 238 to connect the battery 234 to a battery bus 236 of the battery pack 230. The battery strings are connectable in parallel to the battery bus 236.

Each battery pack 230 includes a precharge contactor 240 and a main contactor 242 to connect the intermediate battery bus 236 of a battery pack 230 to a load bus 244. The main contactor 242 is rated for delivering the maximum current that can be provided by the battery pack 230. In certain examples, the main contactor is rated to withstand 100 Amps or greater. The precharge contactor 240 is rated the same as the main contactor 242. The precharge contactor 240 is used to precharge the load when the bringing the battery system online to supply the load. The precharge contactor 240 includes a contact resistance to limit the current when bringing the battery system 120 online. Each of the battery packs 230 include a precharge contactor 240 because, as described elsewhere herein, any of the battery strings 232 can be chosen as the first battery string connected to the load.

Because the battery system 120 is modular, less battery packs can be connected in parallel for smaller battery systems, and more battery packs can be connected in parallel for larger battery systems. The battery system 120 includes a system controller circuit 252 and each battery pack 230 includes a pack controller circuit 250 (e.g., an energy control module or ECM) to control bringing the battery packs 230 of the system online sequentially. The system controller circuit 252 and the pack controller circuits 250 may each include processing circuitry that includes logic to perform the functions described. The processing circuitry may include a microprocessor, application specific integrated circuit (ASIC), field programmable gate array (FPGA), or other type of processor, interpreting or executing instructions in software or firmware. In some examples, one or both of the system controller circuit 252 and the pack controller circuits 250 includes a logic sequencer circuit. A logic sequencer refers to a state machine or other circuit that sequentially steps through a fixed series of steps to perform the functions described. A logic sequencer circuit can be implemented using hardware, firmware, or software. In some examples, one controller circuit (e.g., one processor) performs the functions of both the system controller and the pack controller using separate processes running on the same controller circuit.

The control logic implemented by the system controller circuit 252 and the pack controller circuits 250 is multi-tiered to control operation of the battery system at the pack level and at the string level. This allows two different implemented battery systems 120 to include different numbers of battery packs 230 yet the control logic implemented by the controller circuits can be the same.

Figure 3:
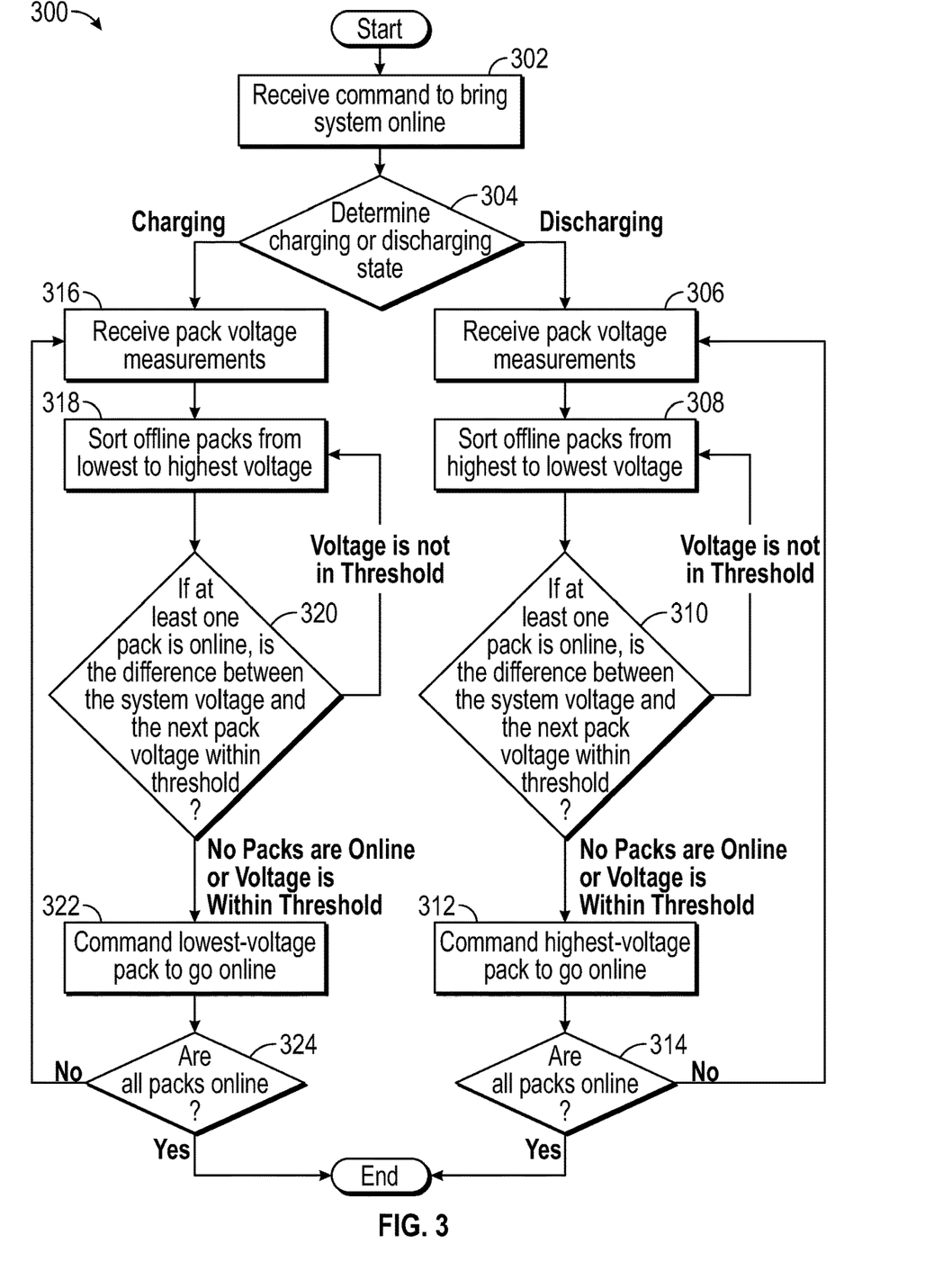
FIG. 3 is a flow diagram of an example of a method of bringing battery packs of a modular battery system online.

FIG. 3 is a flow diagram of an example of a method 300 of operating a machine battery system that includes multiple battery packs connectable in parallel, such as the modular battery system 120 in the example of FIG. 2. At block 302, the system controller circuit 252 receives a command to bring the battery system 120 online.

At block 304, in response to the command, the system controller circuit 252 determines whether the state of the battery system 120 is the charging state or the discharging state. The system controller circuit 252 may receive a command that indicates the state of the system, or the system controller circuit 252 may deduce the state from other inputs to the battery system 120. For example, the command to go online may be received when an "ON" switch of the machine is activated indicating that the battery system 120 is in the discharging state. In another example, the command to go online may be received when a charging system is connected (e.g., plugged in) and the connection to the charger indicates that the battery system is to be placed online in the charging state.

The right side of the flow diagram of FIG. 3 is an example of control logic performed by the battery system 120 in response to the system controller circuit 252 determining the battery system 120 is in the discharging state. At block 306, the system controller circuit 252 receives offline voltages of the battery packs 230. Each pack controller circuit 250 determines the offline voltage of its battery pack 230. This can be determined by monitoring the voltage of the battery strings 232.

For the discharging state, the highest voltage is of interest, and each pack controller circuit determines the highest voltage of its battery strings 232 with the battery strings offline and not connected to the battery bus 236. Each pack controller circuit 250 communicates the highest offline string voltage to the system controller circuit 252 as the battery pack voltage. For example, the battery pack 230 may include one or more analog-to-digital converters (ADCs) to monitor the string voltages and produce a digital value representative of its highest offline string voltage. The pack controller circuit 250 sends the digital value to the system controller circuit 252. The system controller circuit 252 compares the offline voltages of the offline battery packs.

At block 308 in the example of FIG. 3, the system controller circuit 252 compares the voltages by sorting them in order from highest to lowest. At block 310, the system controller circuit 252 determines if any of the battery packs 230 are online. If the battery system 120 is just being brought online for discharging (e.g., to drive the load), none of the battery packs 230 will be online and the method advances to 312, where the system controller circuit 252 sends a command to the pack controller circuit 250 of the battery pack with the highest offline voltage to bring its battery pack 230 online in the discharging mode. To bring the battery pack 230 online for discharging, the pack controller circuit 250 connects the battery string 232 having the highest offline voltage to the battery bus 236 and the load bus 244. To connect the battery string 232 to the battery bus 236, the pack controller circuit 250 activates the battery contactor 238. If this is the first battery pack 230 to go online for discharging, the system controller circuit 252 may send a command to the pack controller circuit to activate the precharge contactor 240 of the battery pack 230. Each battery pack 230 includes a precharge contactor 240 because any one of the battery packs 230 may be the first battery pack brought online. The battery pack 230 may bring its other battery strings 232 online as described elsewhere herein regarding FIG. 4.

In FIG. 3, after the first battery pack is brought online at block 312, at block 314 the method 300 loops back to block 306 and the system controller circuit 252 compares the offline voltages of the remaining offline battery packs 230. The pack controller circuits 250 of the offline battery packs 230 may communicate the offline voltage of its battery pack 230 again for re-sorting by system controller circuit 252 at block 308. In some examples, the system controller circuit 252 uses the previous sorting of the offline voltages and does not re-sort the battery backs according to offline voltage, and the method loops back to block 310.

At block 310, system controller circuit 252 checks whether the next offline battery pack with the next highest offline battery voltage should go online. This next offline battery pack should not be brought online if its offline voltage is so low that in-rush currents would occur. To protect against inrush currents, the offline battery voltage of this next offline battery pack is compared to a predetermined discharge threshold voltage. If the offline battery voltage is within this threshold of the load voltage, the system controller circuit 252 sends a command to the pack controller circuit 250 of this next offline battery pack to go online. In response, the pack controller circuit 250 connects one or more of its battery strings 232 to the battery bus 236 and connects the battery bus 236 to the load bus 244. Because it is not the first battery pack to go online, the pack controller circuit 250 connects its battery bus 236 to the load bus 244 by activating the main contactor 242 of the battery pack 230. The pack controller circuit 250 may report the online status back to the system controller circuit 252.

If the offline battery voltage of this next battery pack 230 is less than the predetermined discharge threshold voltage, the offline voltage of the battery pack 230 is too low and inrush current may occur if the battery pack is brought online. The system controller circuit 252 waits to send the command to go online and continues to monitor the load voltage. The online battery packs will discharge when driving the load and the load voltage will eventually decrease to within the predetermined discharge threshold voltage. At this point, system controller circuit 252 will send the command for the battery pack to be brought online. The pack controller circuit 250 will connect one or more battery strings of its battery pack 230 to the load bus 244. The method continues at block 314 until all the battery packs are online.

In the example of FIG. 3, the left side of the flow diagram is for the charging state and the left side is performed by the system controller circuit 252 in response to the control logic determining the battery system 120 is in the charging state. For the charging state, the lowest voltage is of interest, and each pack controller circuit 250 determines the lowest offline voltage of its battery strings 232 with the battery strings offline and not connected to the battery bus 236. At block 316, each pack controller circuit 250 sends its offline voltage to the system controller circuit 252.

At block 318, the system controller circuit 252 compares the offline voltages of the offline battery packs (e.g., by sorting from lowest to highest). At block 320, it is determined if any battery packs are online. If the battery system 120 is just being brought online for charging (e.g., by a battery charger), no battery packs will be online and the method advances to 322, where the system controller circuit 252 commands the pack controller circuit 250 of the battery pack with the lowest offline voltage to go online.

To bring the battery pack online for charging, the pack controller circuit 250 activates the battery contactor 238 to connect the battery 234 of the battery string to the battery bus 236. If the load bus 244 is used to charge the batteries, the pack controller circuit 250 activates the main contactor 242 to connect the battery 234 of the string to the load bus 244. In some examples, a separate system level bus (not shown) is used to charge the battery system, and the pack controller circuit 250 connects the battery 234 of the string to the system charging bus using a different contactor. The pack controller circuits 250 of the other battery packs wait to bring their battery packs online because their battery packs do not have the lowest offline voltage. The pack controller circuit 250 may bring other battery strings 232 online for charging as described elsewhere herein regarding FIG. 4.

If all the battery packs 230 are not online for charging, the method 300 loops back to block 316 and the system controller circuit 252 compares the offline voltages of the remaining offline battery packs. At block 320, the next offline battery pack with the next lowest offline battery voltage is brought online if that next offline voltage is not too high that in-rush currents would occur. The offline battery voltage of the candidate offline battery pack is compared to a predetermined charge threshold voltage. If the offline battery voltage is within the threshold of the battery system voltage, the system controller circuit 252 sends a command for the next offline battery pack 230 to be brought online. The pack controller circuit 250 of that battery pack 230 connects one or more of its battery strings 232 to the battery bus 236 and connects the battery bus 236 to the load bus 244 or a separate system level charging bus (not shown).

If the offline battery voltage is not within the predetermined threshold voltage threshold, the offline voltage of the battery pack 230 may be too high for charging. The system controller circuit 252 waits to send the command for the next offline battery pack 230 to be brought online for charging and continues to monitor the load voltage. The online battery packs will charge, and the battery system voltage will increase to within the threshold of the offline battery pack. At block 322, the system controller circuit 252 commands the pack controller circuit 250 to connect one or more of the battery strings 232 of its battery pack 230 to the load bus 244 or a charging bus. The method 300 continues at block 324 until all the battery packs are online.

Figure 4:
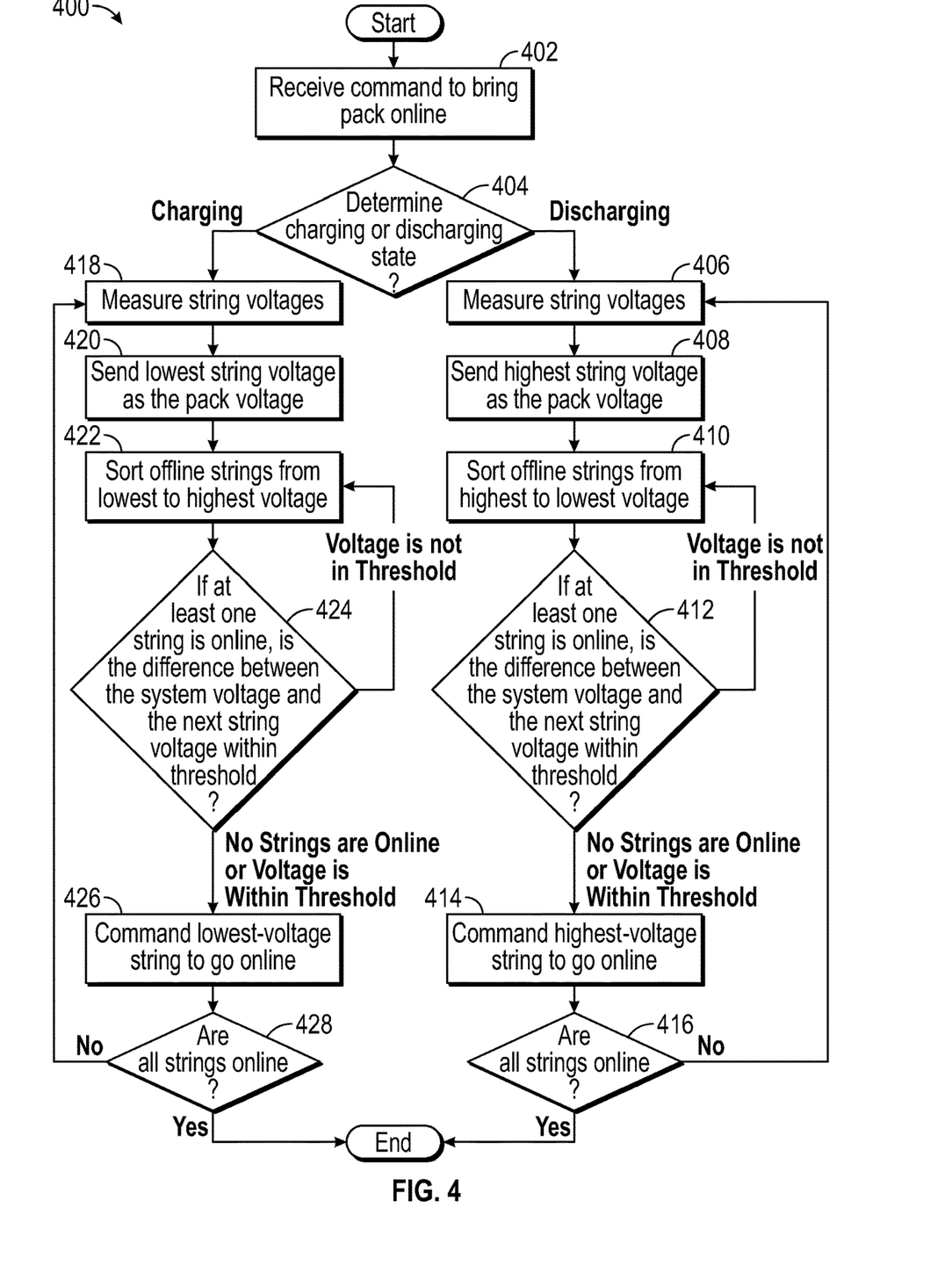
FIG. 4 is a flow diagram of an example of a method of bringing multiple battery strings of a battery pack online.

FIG. 4 is a flow diagram of an example of a method 400 for bringing the battery strings 232 of a battery pack 230 online. The method 400 may be performed using the pack controller circuit 250 of the example battery system 120 of FIG. 2. At block 402, the pack controller circuit 250 receives a command (e.g., from the system controller circuit 252) to bring its battery pack 230 online.

At block 404, the right side or the left side of the flow diagram is traversed depending on whether the state of the battery system is in the discharging state or the charging state. The right side of the flow diagram of FIG. 4 is an example of control logic for the discharging state. The pack controller circuit 250 may perform the functions on the right side of the flow diagram when the received command indicates that the battery pack 230 is to be brought up in the discharging state.

At block 406, the pack controller circuit 250 determines the offline string voltages of the offline battery strings 232. A battery string 232 is offline when the battery string is not connected to the battery bus 236. At block 408, the pack controller circuit 250 communicates the highest offline string voltage of its battery pack 230 to the system controller circuit 252 as the offline battery pack voltage, and at block 410 the pack controller circuit 250 sorts the offline string voltages of the offline battery strings 232 from highest to lowest.

If no battery strings 232 are currently online, at block 414 the battery string 232 with the highest offline string voltage is brought online by connecting the battery string 232 to the battery bus 236 using the battery contactor 238. The method 400 loops back to block 406 to determine if the next battery string 232 with the next highest offline string voltage can be brought online.

Because the battery system 120 is in the discharging state, it is determined whether the offline string voltage of the next offline battery string is too low compared to the load voltage and could cause inrush current if brought online. At block 412, the pack controller circuit 250 determines whether the offline string voltage of the candidate offline battery string 232 is within a predetermined discharge voltage threshold. If it is within the threshold, at block 414 the offline battery string 232 is brought online by connecting the battery string 232 to the battery bus 236 using the batter contactor 238. If the offline string voltage is less than the predetermined discharge voltage threshold, the pack controller circuit 250 waits to bring the candidate battery string 232 online until the battery string 232 is within the threshold, and the battery string 232 is brought online at 414. At block 416, the method 400 loops back and subsequent battery strings are brought online in order of next highest offline battery voltage.

In the example of FIG. 4, the left side of the flow diagram is for the charging state and the left side is performed by the pack controller circuit 250 in response to a command from the system controller circuit 252 to bring the battery pack 230 online in the charging state.

At block 418, the pack controller circuit 250 determines the offline string voltages of the offline battery strings 232. At block 420, the pack controller circuit 250 communicates the lowest offline string voltage of its battery pack 230 to the system controller circuit 252 as the offline battery pack voltage, and at block 422 the pack controller circuit 250 sorts the offline string voltages of the offline battery strings 232 from lowest to highest.

If no battery strings 232 are currently online, at block 426 the battery string 232 with the lowest offline string voltage is brought online by connecting the battery string 232 to the battery bus 236 using the battery contactor 238. The method 400 loops back to block 418 to determine if the next battery string 232 with the next lowest offline string voltage can be brought online.

Because the battery system 120 is in the charging state, it is determined whether the offline string voltage of the next offline battery string is too high compared to the battery system voltage to be brought online. At block 424, the pack controller circuit 250 determines whether the offline string voltage of the candidate offline battery string 232 is within a predetermined charge voltage threshold of the battery system voltage. If it is within the threshold, at block 426 the offline battery string 232 is brought online by connecting the battery string 232 to the battery bus 236 using the battery contactor 238. If the offline string voltage is greater than the predetermined discharge voltage threshold, the pack controller circuit waits to bring the candidate battery string 232 online until the battery string 232 is within the threshold and the battery string 232 is then brought online at 426. At block 428, the method 400 loops back and subsequent battery strings are brought online in order of next lowest offline battery voltage.

Figure 5:
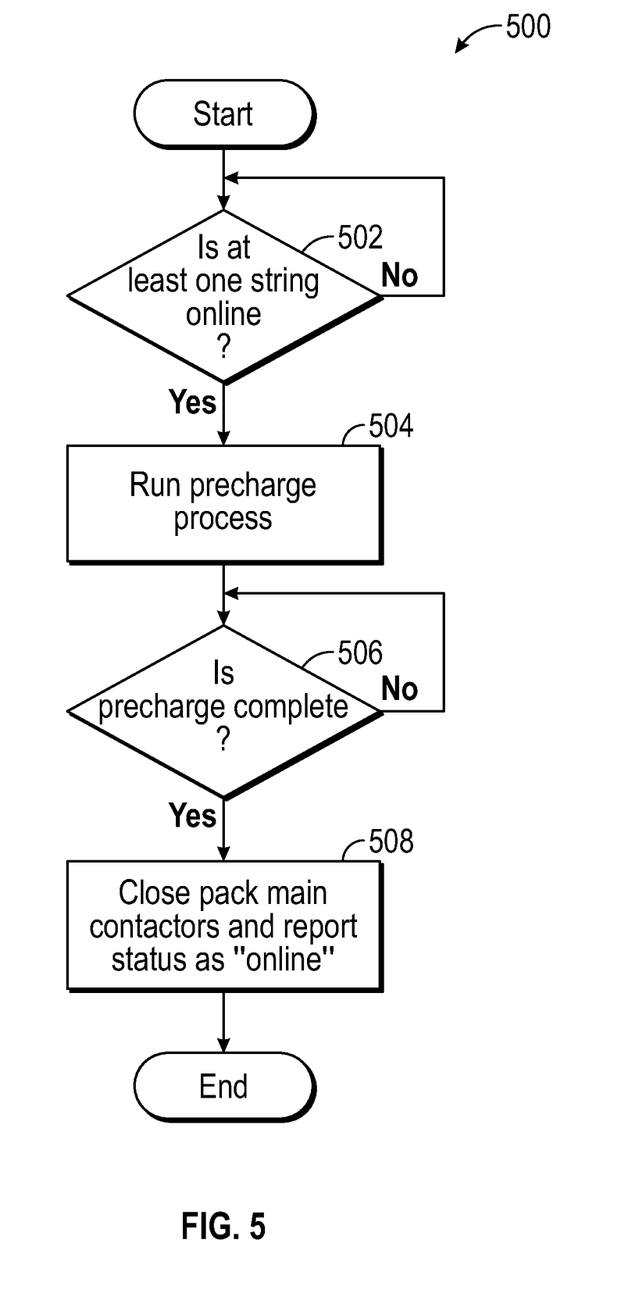
FIG. 5 is a flow diagram of a process to precharge a load using a modular battery system.

As explained previously herein in regard to FIG. 3, the first battery pack 230 to go online for discharging precharges the load connected to the load bus 244 of the battery system 120. FIG. 5 is a flow diagram of the control logic for a precharge process. The precharge logic may be performed by the first pack controller circuit 250 to bring its battery pack 230 online for discharging. At 502, it is determined when a battery string is online and is connected to the battery bus 236 of the battery pack 230. When a string is available to precharge the load, the precharge process is started at block 504. As explained previously herein, the precharge process involves connecting the battery bus 236 to the load using the precharge contactor 240 of the battery pack 230. The precharge contactor 240 can include a resistance (e.g., one or more resistors) to provide energy to the load more slowly than if the battery bus 236 is connected using the main contactor 242. At block 506, when the precharge process is complete, the main contactor 242 is activated at block 508 to connect the battery bus 236 to the load bus 244. The pack controller circuit 250 may report the status of the battery pack 230 as online to the system controller circuit 252.

Each battery pack operates independently of the other battery packs. This allows a battery pack to be used as a stand-alone system or with any number of other battery packs combined into one system to achieve the overall energy capacity desired. The control logic supervises the activation of the large capacity battery cells to protect against large inrush currents despite the complex multiple bus structure. Similar control logic is used at both the system level to sequence activation of the individual battery packs and the pack level to sequence activation of the individual battery strings. This reduces development costs.

INDUSTRIAL APPLICABILITY

In an example of bringing a modular battery system for a work machine online according to this disclosure, individual battery packs of the battery system need to be brought online in a safe manner. This is complicated by the complex structure of the battery system. The modular battery system includes multiple battery packs that are connectable in parallel. Each of the battery packs include multiple battery strings that each contain a battery cell of large capacity. Battery cells are connected in parallel internally to a battery bus in the battery pack. The battery buses of the battery packs are connected to a system level load bus.

Because of the large capacity battery cells, the battery packs should not be activated at the same time. Relatively small differences in voltage between the battery cells can result in large inrush currents that can cause damage to the battery cells and other components of the battery system. To guard against inrush currents, the battery cells are brought online individually for discharging to drive the load while monitoring the difference between the voltages of the battery cells and the load voltage. A battery cell is not brought online until the difference between the voltages minimizes the risk of inrush currents.

Similar monitoring is used when charging the large capacity battery cells. The battery cells are brought online individually for charging while monitoring the difference between the voltages of the battery cells and the overall battery system voltage. A battery cell is not brought online until the difference between the voltages minimizes the risk of inrush currents.

The above detailed description is intended to be illustrative, and not restrictive. The scope of the disclosure should, therefore, be determined with references to the appended claims, along with the full scope of equivalents to which such claims are entitled.

What is claimed is:

1. A modular battery system, the system comprising:
   a system controller circuit;
   a load bus; and
   multiple battery packs connectable to the load bus, wherein a battery pack of the multiple battery packs includes (i) multiple battery strings, each battery string including one or more battery cells, and (ii) a pack controller circuit configured to:
   determine an offline pack voltage of the battery pack and communicate the offline voltage to the system controller circuit;
   receive a command from the system controller circuit to bring the battery pack online in a discharge state;
   bring the multiple battery strings of the battery pack online and connect the battery pack to the load bus when the battery pack has a highest offline pack voltage and other battery packs are unconnected to the load bus;
   bring the multiple battery strings of the battery pack online and connect the battery pack to the load bus when the battery pack has the highest offline pack voltage of the multiple battery packs unconnected to the load bus and the offline pack voltage is within a predetermined discharge threshold of a load voltage; and
   wait to connect the battery pack to the load bus when the battery pack has the highest offline pack voltage of the multiple battery packs unconnected to the load bus and the offline pack voltage is less than the predetermined threshold of the load voltage, and connect the battery pack to the load bus when the load voltage decreases so that the offline pack voltage is within the predetermined discharge threshold of the load voltage.

2. The system of claim 1, wherein the battery pack of the multiple battery packs includes a battery bus, and each of the multiple battery strings of the battery pack include a string contactor to connect a battery string of the multiple battery strings to the battery bus.

3. The system of claim 2,
   wherein the battery pack of the multiple battery packs includes:
   a precharge contactor; and
   a main contactor; and
   wherein the system controller circuit is configured to send a command to the pack controller circuit to connect the battery bus to the load bus using the precharge contactor when a battery string of the battery pack is a first battery string to be connected to the load bus; and
   wherein the system controller circuit is configured to send a command to the pack controller circuit to connect the battery bus to the load bus using the main contactor when the battery string is not the first battery string to be connected to the load bus.

4. The system of claim 3, wherein the main contactor is rated to 100 Amperes or greater.

5. The system of claim 2, wherein the pack controller circuit is configured to:
   connect a first battery string with a highest offline string voltage to the battery bus when other battery strings are unconnected to the battery bus;
   connect a next battery string with a next highest offline string voltage to the battery bus when the next highest offline string voltage is within the predetermined discharge threshold of the load voltage;
   wait to bring the next battery string with the next highest offline string voltage online when the next highest offline string voltage is less than a predetermined discharge threshold of the load voltage, until the next highest offline string voltage is within the predetermined discharge threshold of the load voltage; and
   bring subsequent battery strings online in order of highest offline battery voltage.

6. The system of claim 1, wherein a battery string of the multiple battery strings is rated greater than fifty kilowatt-hours.

7. The system of claim 1, wherein the pack controller circuit of the battery pack is configured to:
   receive a command from the system controller circuit to place the battery pack online in a charge state;
   bring the battery pack online and at least one battery string of the battery pack online when the battery pack has a lowest offline pack voltage and other battery packs are offline;
   bring the battery pack online when the battery pack has the lowest offline pack voltage of the multiple battery packs, at least one of the multiple battery packs is online, and the offline pack voltage is within a predetermined charge threshold of a battery system voltage; and
   wait to bring the battery pack online when the battery pack has the lowest offline pack voltage of the multiple battery packs offline and the offline pack voltage is less than the predetermined charge threshold of the battery system voltage.

8. The system of claim 7, wherein the pack controller circuit is configured to:
   connect a first battery string with a lowest offline string voltage to the battery bus when other battery strings are unconnected to the battery bus;
   connect a next battery string with a next lowest offline string voltage to the battery bus when the next lowest offline string voltage is within the predetermined charge threshold of the battery system voltage;
   wait to bring the next battery string with the next lowest offline string voltage online when the next lowest offline string voltage is less than the predetermined charge threshold of the battery system voltage, until the next lowest offline string voltage is within the predetermined charge threshold of the battery system voltage; and
   bring subsequent battery strings online in order of lowest offline string voltage.

9. The system of claim 7, wherein the system controller circuit is configured to determine the charge state of the battery system when detecting connection to a battery charger.

10. A non-transitory computer-readable storage medium including instructions that, when performed by a hardware processor of a battery pack having multiple battery strings, cause the battery pack to perform operations comprising:
- receive a command to bring the battery pack online in a discharge state;
- bring the multiple battery strings of the battery pack online individually and connect the battery pack to a load bus when the battery pack has a highest offline pack voltage and other battery packs are unconnected to the load bus;
- bring the multiple battery strings of the battery pack online individually and connect the battery pack to the load bus when the battery pack has the highest offline pack voltage of the multiple battery packs offline and the offline pack voltage is within a predetermined discharge threshold of a load voltage; and
- wait to connect the battery pack to the load bus when the battery pack has the highest offline pack voltage of the multiple battery packs offline and the offline pack voltage of the battery pack is less than the predetermined discharge threshold of the load voltage, and connect the battery pack to the load bus when the load voltage decreases so that the offline pack voltage is within the predetermined discharge threshold of the load voltage.

11. The non-transitory computer-readable storage medium of claim 10, including instructions that cause the battery pack to perform operations including:
- bring a first battery string of the multiple battery strings with the highest offline string voltage online when all the multiple battery strings are offline;
- bring a next battery string with a next highest offline string voltage online when the next highest offline string voltage is within the predetermined discharge threshold of the load voltage;
- wait to bring the next battery string with the next highest offline string voltage online when the next highest offline string voltage is less than the predetermined discharge threshold of the load voltage, until the next highest offline string voltage is within the predetermined discharge threshold of the load voltage; and
- bring subsequent battery strings of the multiple battery strings online in order of highest offline string voltage.

12. The non-transitory computer-readable storage medium of claim 10, including instructions that cause the battery pack to perform operations including:
- receive a command to bring the battery pack online in a charge state;
- bring the multiple battery strings of the battery pack online individually when the battery pack has a lowest offline pack voltage and other battery packs are offline;
- bring the multiple battery strings of the battery pack online individually when the battery pack has the lowest offline pack voltage of the multiple battery packs offline and the offline pack voltage is within a predetermined charge threshold of a battery system voltage; and
- wait to connect the battery pack to the load bus when the battery pack has the highest offline pack voltage of the multiple battery packs offline, and the offline pack voltage of the battery pack is less than the predetermined charge threshold of the load voltage.

13. The non-transitory computer-readable storage medium of claim 12, including instructions that cause the battery pack to perform operations including:
- bring a first battery string of the multiple battery strings with the lowest offline string voltage online when all the multiple battery strings are offline;
- bring a next battery string with a next lowest offline string voltage online when the next lowest offline string voltage is within the predetermined charge threshold voltage of the battery system voltage;
- wait to bring the next battery string with the next lowest offline string voltage online when the next lowest offline string voltage is less than the predetermined charge threshold voltage of the battery system voltage until the next lowest offline string voltage is within the predetermined charge threshold of the battery system voltage; and
- bring subsequent battery strings online in order of lowest offline string voltage.

* * * * *